United States Patent
Stöppelmann et al.

[11] Patent Number: 6,150,474
[45] Date of Patent: Nov. 21, 2000

[54] POLYAMID-POLYKETON-BLENDS

[75] Inventors: Georg Stöppelmann, Bonaduz; Manfred Hewel, Rodels, both of Switzerland

[73] Assignee: EMS-Inventa AG, Switzerland

[21] Appl. No.: 09/218,343

[22] Filed: Dec. 22, 1998

[30] Foreign Application Priority Data

Dec. 23, 1997 [DE] Germany ............................ 197 57 607

[51] Int. Cl.$^7$ ...................................................... C08L 77/00
[52] U.S. Cl. ........................... 525/426; 525/420; 525/421
[58] Field of Search ...................................... 525/421, 426

[56] References Cited

U.S. PATENT DOCUMENTS

| | | | |
|---|---|---|---|
| 4,839,437 | 6/1989 | Gergen et al. | 525/426 |
| 4,874,825 | 10/1989 | Gergen | 525/425 |
| 5,175,210 | 12/1992 | Machado | 525/64 |

*Primary Examiner*—Ana Woodward
*Attorney, Agent, or Firm*—Kinney & Lange

[57] ABSTRACT

The invention relates to a polymer blend composition containing (A) a linear alternating polyketone polymer on the basis of carbon monoxide and at least one ethylenically unsaturated hydrocarbon compound, (B) at least one polyamide and/or block copolyester amide, (C) optionally customary auxiliaries and additives such as stabilizers, pigments, fillers, plasticizers and impact modifiers, the polyamide and/or the block copolyester amide (B) having a carboxyl/amino end-groups ratio of more than 1.

11 Claims, No Drawings

POLYAMID-POLYKETON-BLENDS

BACKGROUND OF THE INVENTION

The present invention relates to polymer blend compositions containing polyamides (also called PA for short) and/or block copolyester amides, aliphatic polyketones (also called PK for short) and optionally customary auxiliaries and additives. The invention also relates to the preparation of these polyamide/polyketone (PA/PK) blend compositions.

It is known from the organic chemistry of low-molecular-weight compounds that molecules which contain ketone groups can react with each other. This reaction, which can proceed in both base- and acid-catalysed forms, is called aldol condensation. Since polyamides contain both acid COOH— and basic amino end-groups, the possibility exists that polyketones are crosslinked by the addition of polyamides. In kneading tests in which mixtures of polyketone and amino- or carboxyl-terminated PA 12 were studied, it was shown that the crosslinking of polyketones is caused mainly by the amino end-groups of the polyamide.

Blends made from linear alternating polymers comprising CO and olefins and impact-modified PA6/ABS blends are described in EP-A-057 374. These systems are morphologically complex systems which necessarily contain rubber-like portions. This rubber portion can lead to the reduction of the dimensional stability in heat. The yield stress is also reduced, as described in the examples.

PK/PC blends in which graft polymers comprising PC and PA6 act as compatibilizers are described in Statutory Invention Registration H1601. However, there is still no increase in impact strength when this graft polymer is added at the rate of 5%.

Ternary polymer blends comprising PK, PA and maleic anhydride-grafted block copolymers are described in U.S. Pat. No. 5,175,210. According to this teaching, however, PAs are used at the rate of up to 20% as compatibilizers. If greater proportions of PA are to be achieved for the PA/PK blends, SEBS block copolymers are necessary as compatibilizers.

PK/PA blends in which the polyamide has a molar mass of at least 5000 g/mol are described in U.S. Pat. No. 4,839,437. The polyamides contained in the PK/PA blends have too high a concentration of amino end-groups, which leads to crosslinking reactions (cf. col. 5, 11. 24–26).

U.S. Pat. No. 4,874,825 describes PK/polyether ester amide blends where the molar mass of the polyether ester amide is likewise limited (15,000 g/mol).

Ketone resins are unsaponifiable and neutrally reacting resins (synthetic resins), with a bright colour and softening ranges of ca. 80–130° C., which result from the alkaline-catalysed self-condensation of ketones (cyclohexanone, methylcyclohexanone) or mixed condensation of ketones (acetone, butanone, acetophenone, cyclohexanone, methylcyclohexanone) with formaldehyde. Mixed condensates of ketones (e.g. cyclohexanone) with longer-chained aldehydes are not of industrial importance. Depending on the starting ketone, the ketones are divided into acetone, acetone phenone resins etc. Ketones comprising mixtures of different ketones are also known.

Polyketone polymers are known in the state of the art. For example, U.S. Pat. No. 4,880,903 describes linear alternating polyketone terpolymers on the basis of carbon monoxide ethylene and other olefinically unsaturated hydrocarbons, such as propylene.

U.S. Pat. No. 4,843,144 describes a process for the preparation of linear alternating polyketone polymers comprising carbon monoxide and at least one ethylenically unsaturated hydrocarbon using palladium catalysts.

Other aliphatic polyketones on the basis of ethylene, carbon monoxide and propylene are described e.g. in EP-A-457 374 and EP-A-569 101 and are supplied to the market under various trade names.

It is clear from the documents mentioned above that it was not previously possible to prepare pure PK/PA blends over the whole composition range without limiting the PA molar mass. Also, the compounding of these blends was difficult, as there was the risk of crosslinkings or decomposition.

The object was therefore to provide PA/PK blends whose composition covers the whole concentration range, which possess viscosities matched to the different processing methods without crosslinking or decomposition reactions occurring during preparation.

This object is achieved according to the invention by the polymer blend composition according to Claim 1 and by the process according to Claim 11 or 12 and by the uses according to Claim 13.

Advantageous versions of the invention are contained in the dependent claims.

SUMMARY OF THE INVENTION

The present invention includes a polymer blend composition that includes a linear alternating polyketone polymer based on carbon monoxide and at least one ethylenically unsaturated hydrocarbon compound, where the linear alternating polyketone polymer displays recurring units of the following formula:

$$-[CO-(CH_2-CH_2)]_x-[CO-(G-)]_y \qquad (I)$$

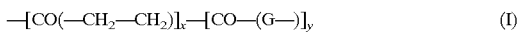

in which G is derived from an á-olefin monomer having at least 3 carbon atoms which are connected to each other by at least one ethylenically unsaturated bond, x and y are whole numbers, and the ratio of y to x is not more than 0.5. The polymer blend composition of the present invention also includes at least one polyamide having a numerical average molecular weight of above 5000 or at least one block copolyester amide, with the polyamide or the block copolyester amide having a carboxyl/amino end-groups ratio of more than 1. Additionally, in the polymer blend composition, the mixture ratio of the polyamide or the block copolyester amide to the polyketone polymer, relative to the polymer blend composition, ranges from 95 to 5 wt.-% to 5 to 95 wt.-% and the melting point of the polyamide or block copolyester amide does not exceed the melting point of the polyketone polymer. The present invention further includes a process of preparing the polymer blend composition and a use of the polymer blend composition.

DETAILED DESCRIPTION OF THE PREFERRED EMBODIMENTS

According to the invention it was established that stable PA/PK blends can be prepared only if the PAs or CoPAs used in the PK/PA blends have a clear surplus of COOH groups, i.e. have a carboxyl/amino end-groups ratio of more than 1. Those PAs in which the $NH_2$ end-groups concentration is equal to or less than 15 µÄq/g are particularly preferred. The carboxyl end-groups preferably have values of at least 80 µÄq/g. This can be achieved by adding acids during the polycondensation of the polyamides, i.e. of component (B). A further condition is that the melting point of component (B), i.e. of the PA should not exceed 265° C. Melting points of 150 to 250° C. are preferred, and 175 to 240° C. particularly preferred. The usual aliphatic PAs and CoPAs can be used, plus those which possess cycloaliphatic and/or aromatic monomers. The PA can also contain the usual additives such as stabilizers, pigments, fillers, plasticizers, impact modifiers or also electrostatic charge dissipating additives such as carbon black or other carbon modifications.

The polyketone contained in the composition according to the invention (component (A)) is characterized by the following general formula I:

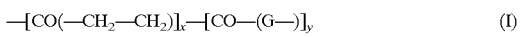
—[CO(—CH$_2$—CH$_2$)]$_x$—[CO—(G—)]$_y$ (I)

in which G is derived from an α-olefin monomer having at least 3 carbon atoms which are connected to each other by at least one or more ethylenically unsaturated bond(s), x and y are whole numbers, and the ratio of y to x is not more than 0.5.

In particular, the polymer G in formula I is propylene and the ratio of x to y between 0.01 and 0.1.

The polyketone (A) according to the invention is characterized in that it is an alternating copolymer comprising ethylene and carbon monoxide, and a further olefin such as for example propylene or butene can be polymerized in.

Polyketone polymers with a melting point of 175° C. to 300° C., in particular of 210° C. to 270° C., are of particular interest. The polymers typically have a limiting viscosity number (LVN), measured in m-cresol at 60° C., of 0.5 dl/g to 10 dl/g, preferably of 0.8 dl/g to 4 dl/g.

Polyketone polymers are known per se from the state of the art (cf. U.S. Pat. Nos. 4,880,903, 4,843,144).

In a preferred embodiment of the present invention as polyamides (B) could be used aliphatic and partially crystalline and/or partially amorphous or semikristalline polyamides or copolyamids which could be produced from lactams, ω-aminocarboxylic acids,dicarboxylic acids, diamines, dicarboxylic acids/diamine salts. If e.g. caporolactam is used as starting monomer, then at least one dicarboxylic acid selected from adipic acid, sebacic acid and terephthalic acid and/or isophthalic acid and at least one diamine selected from hexamethylene and tetramethylene diamine, or dicarboxylic acid-diamine salts thereof, can be polymerized or polycondensed. Adipic acid and terephthalic acid are particularly preferred as dicarboxylic acid. With a suitable selection of the starting monomers for the polymerization or polycondensation, the polyamides PA6, PA66, PA610, PA612, PA8, PA88, PA9, PA11, PA12, PA1212, PA1112, PA1012 and similar are obtained for example. The identification of the polyamides corresponds to international standards, the first figure(s) giving the C-atom count of the starting diamine and the last figure(s) the C atom of the dicarboxylic acid. If only one figure is given, this means that the starting product was an á, ù-aminocarboxylic acid or the lactam derived therefrom (cf. H. Dominghaus, die Kunststoffe und ihre Eigenschaften, p. 272, VDI Verlag, 1976).

If copolyamides (component (B)) are used, these can, as already stated above, contain e.g. adipic acid, sebacic acid, suberic acid, isophthalic acid, terephthalic acid as co-acid or -(4'-aminocyclohexyl)-methane, trimethylhexamethylene diamine, hexamethylene diamine, or similar as co-diamine.

The preparation of these polyamides is known cf. e.g. D. B. Jakobs, J. Zimmermann, Polymerisation Processes, pp. 424 to 467, Interscience Publishers, New York 1977; DE-AS 2152194.

Mixed aliphatic/aromatic polycondensates, such as are described e.g. in U.S. Pat. Nos. 2,071,250, 2,071,251, 2,130,523 etc. are also suitable as polyamides. Polycondensates suitable as polyamides are poly(ether ester amides) or poly (ether amides). Such products are described e.g. in DE-OS 2712987, 2523991, 3006961.

The molecular weight (numerical average) of the polyamides lies above 5000 and preferably above 10000— corresponding to a relative viscosity ($n_{rel}$) in the range from 1.50 to 2.4.

The polyamides of component (B) can be contained at the rate of up to 40 wt.-% in other thermoplastics if they do not disturb the properties according to the invention. There may be cited in particular here polycarbonate, acrylonitrile/styrene acrylate, acrylonitrile/styrene copolymerizates or polyphenylene ether.

If it is necessary, the polyamides can be made impact resistant. Suitable modifiers are e.g. ethylene/propylene or ethylene/propylene-diene copolymers. Furthermore, rubbers which have been made impact resistant can also be used. The proportion of components creating impact resistance is to be so chosen, however, that the desired properties are not made worse.

In another version, 0.02 to 0.25 wt.-% 4-amino-2,2,6,6-tetraalkylpiperidine can be added to the polyamide starting monomers.

The triacetone diamine compound is bound to the chain end of the polymer chain by reaction of its primary amino groups with the starting monomers or with the carboxyl groups of the resulting polyamide. The secondary amino group of the triacetone diamine compound does not react because of steric hindrance. Thus the triacetone diamine compound also acts as a chain regulator. The main effect of this triacetone diamine compound, however, is that it inherently light- and heat-stabilizes the polyamide. The prepared polyamide thus offers the advantage that a separate process step that would otherwise be needed for the mixing of a stabilizer into the polyamide is no longer necessary.

In a preferred version of the invention, the triacetone diamine compound is combined with at least one of the customary chain regulators. Chain regulators are e.g. monocarboxylic acids such as acetic acid, propionic acid and benzoic acid. The chain regulator combination and the quantities used are selected inter alia according to the desired amino end-group content of the end-product and according to the desired melt stability. The amino end-group content is also based e.g. on the desired colorability of the fibers or filaments.

The component (B) used according to the invention, i.e. the aliphatic, partly crystalline or partly aromatic amorphous polyamides (B) can, in a special version of the invention, essentially be built up from polyamide-forming monomers (I), 0.02 to 0.25 wt.-% 4-amino-2,2,6,6-tetraalkyl piperidine (II), 0 to 0.2 wt.-% of an aliphatic or cylcoaliphatic diamine (III) which bears a primary and tertiary amino group, and 0 to 0.7 wt.-% of a 2,6-dialkylphenyl (IV), functionalized in 4-position to an OH-group, of the formula

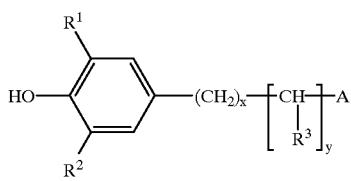

in which $R^1$ and $R^2$ are identical or different alkyl radicals with 1 to 6 C atoms, $R^3$ is either a hydrogen atom or a methyl group, the functional group A represents either a free carboxyl group or a carboxyl group esterified with $C_1$–$C_4$ alcohols or a primary amino group, for x and y in the case of the amino group the value combinations (x=2/y=1); (x=2/y=0); (x=1/y=0) and (x=0/y=1) are possible and in the case of the free or esterified carboxyl group x and y can additionally each be 0, the quantity of the components I to IV making up to 100 wt.-%, the total of the components II, III and IV being 0.02 to 1.2 wt.-% and the components II, III and IV being bound to the polymer chains via amide bonds.

In another special version of the invention, the polyamides accessible from lactams, ω-aminocarboxylic acids can essentially be built up from polyamide-forming monomers (I)

0.02–0.25 wt. % 4-amino-2,2,6,6-tetraalkyl piperidine (II),

0–0.02 wt.-% of an aliphatic or cylcoaliphatic diamine (III) which bears a primary and tertiary amino group, optionally 0.02–0.7 wt.-% of a 2,6-dialkylphenyl (IV), functionalized in 4-position to the OH-group, of the formula

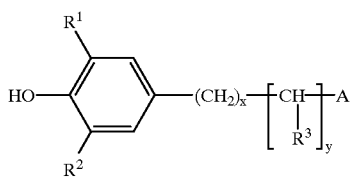

in which $R^1$ and $R^2$ are identical or different alkyl radicals with 1 to 6 C atoms, $R^3$ is either a hydrogen atom or a methyl group, the functional group A represents either a free carboxyl group or a carboxyl group esterified with C1–$C_4$ alcohols or a primary amino group, for x and y in the case of the amino group the value combinations (x=2/y=1); (x=2/y=0); (x=1/y=0) and (x=0/y=1) are possible and in the case of the free or esterified carboxyl group x and y can additionally each be 0, and 0.1 to 1.2 wt.-% of a tri-, tetra- or polycarboxylic acid (V), the quantities of the components I to V making up to 100 wt.-%, the total of the components II, III, IV and V being 0.2 to 2.5 wt.-% and the components II, III, IV and V being bound to the polymer chains via amide bonds.

The component (B) that can be used as block copolyester polyamide can also be a partly crystalline block copolyester polyamide comprising differently structured segments, the block copolyester amide being able to be biologically degradable and there being present as segments at least one polyester or copolyester block having a uniform numerical average molar mass between 340 and 10,000 g/mol and at least one polyamide or copolyester block having a uniform numerical average molar mass between 400 and 3000 g/mol and optionally a copolyester amide block having a uniform numerical average molar mass between 500 and 5000 g/mol.

The polyester, the copolyester, the polyamide, and the copolyamide and copolyester polyamide blocks can be built up from aliphatic monomer units, up to 50 mol.-% of the total monomers being able to be replaced by aromatic units.

The polyester blocks and the copolyester blocks can also be built up from lactones or hydroxycarboxylic acids and have a numerical average molar mass of 340 to 6,000 g/mol, preferably 340 to 3,000 g/mol, particularly preferably 340 to 1,500 g/mol.

The polyester blocks and the copolyester blocks which are built up from lactones or hydroxycarboxylic acids and by small portions of higher-functional aliphatic alcohols have a functionality of 2 or more than 2, in particular of 2 to 4.

The lactones are preferably caprolactone and butyrolactone, and the hydroxycarboxylic acids are preferably α, β, γ and ω hydroxycarboxylic acids, their co-oligomers and also their cyclic esters, selected from the group of the dilactides and diglycolides.

The polyester or copolyester blocks are built up from bifunctional alcohols, in particular from those with 2 to 10 C atoms and from dicarboxylic acids, especially from those with 2 to 44 C atoms, in particular from those dicarboxylic acids with 2 to 18 C atoms and with 36 C atoms and with 44 C atoms.

The polyamide or copolyamide blocks are built up from monomers, selected from the group comprising lactam with 6 to 12 C atoms, ω-amino acids with 6 to 12 C atoms, aliphatic diamines with 2 to 10 C atoms and dicarboxylic acids with 2 to 44 C atoms, in particular dicarboxylic acids with 2 to 18 C atoms and dicarboxylic acids with 36 C atoms and with 44 C atoms.

In particular, the copolyester amide blocks are selected from the group of the monomers of the polyester, copolyester, polyamide, copolyamide blocks and from linear aliphatic amino alcohols with 2 to 8 C atoms.

The aromatic units are in particular isophthalic acid, terephthalic acid and naphthalene dicarboxylic acid units.

The blocks from the group of the polyesters, copolyesters and copolyester amides have at least 95% OH end-groups.

The blocks from the group of the polyamides and copolyamides have at least 95% carboxyl end-groups.

The polyester or copolyester blocks are linear and have a numerical average molar mass between 340 and 2,000 g/mol.

The substances used as block copolyester polyamide are described in great detail in DE 44 44 948.8. The disclosure content of DE 44 44 948.8 (Ems-Inventa) is thereby also made the subject-matter of the present application.

If, according to a particular version of the invention, a polyfunctional, for example trifunctional carboxylic acid is added to the melt of the base monomers comprising pure amino acid and/or lactam), a polymer molecule grows in definedly three directions which always bears the carboxy group at its chain end. Since carboxy groups do not react with each other under customary condensation conditions, no crosslinking can occur.

If copolyamides are prepared for example from 6-lactam as well as ω-aminoundecanic or ω-aminododecanic acid using chain structure regulation and adding a trifunctional carboxylic acid such as e.g. nitrilotriacetic acid, nitrilotripropionic acid or trimethylnitro-tripropionic acid, then the desired concentration of the end-groups can be controlled with chain regulators. Their melting point is controlled by the ratio of the base monomers.

A large number of homopolyamides, copolyamides and block copolyamides can be built up from the polyamide-forming monomers (I) listed above. The homopolyamides to which the process according to the invention is applied for the creation of the polymer blend compositions include polyamide 6, 11, 12, 66, 69, 610, 612, 6I and MXDA 6.

The copolyamides and block copolyamides accordingly include the following products: copolyamide 6/12, 6/66, 66/12, 6/66/12, 6/69, 6/610, 66/610 as well as other ternary and quaternary copolyamides from these monomers, copolyamide 6T/6I with less than 45 mol.-% hexamethylene terephthalamide, the copolyamides built up from laurin lactam or ω-aminolauric acid, isophthalic acid and/or terephthalic as well as the isomeric bis-(4-amino-3-methylcyclohexyl)methanes or 2,2-bis-(4-aminocyclohexyl) propanes, the copolyamide comprising dodecandic acid and the isomeric bis-(4-amino-3-3-methylcyclohexyl)methanes and the block copolyether amides which are built up from caprolactam or laurin lactam, dicarboxylic acids and α, ω-aminopoly(oxy-1,2-propylene).

The following examples explain the invention without limiting it (embodiments according to the invention compared with examples not according to the invention).

TABLE 1

| | Melting point (° C.) | Relative viscosity (m-cresol) | COOH end-groups (μÄq/g) | NH$_2$ end-groups (μÄq/g) | MVI (cm$^3$/10 min) |
|---|---|---|---|---|---|
| PA1 | 178 | 1.66 | 80 | 15 | 40 230° C., 2.16 kg |
| PA2 | 178 | 1.65 | 10 | 100 | 70 230° C., 2.16 kg |
| PA3 | 178 | 1.9 | 70 | 20 | 100 275° C., 5 kg |
| PA4 | 178 | 2.25 | 40 | 30 | 20 275° C., 5 kg |

The PA/PK blends were prepared on a 30 mm ZSK 30 twin-screw extruder from the company Werner & Pfleiderer at temperatures between 240 and 250° C. In each case, the polyketone and also the polyamide were dispensed separately into the feed zone of the extruder. In the examples not according to the invention, the test had to be stopped because of decomposition reactions. Embodiments according to the invention compared with examples not according to the invention are to be deduced from the following Table 2.

TABLE 2

| | 1 | 2 | 3 | 4 | 5 | 6 | 7 | 8 | 9 | V1 | V2 | V3 |
|---|---|---|---|---|---|---|---|---|---|---|---|---|
| PA1 | 95 | 90 | 80 | 70 | 50 | 30 | 20 | 10 | 5 | | | |
| PA2 | | | | | | | | | | 95 | | |
| PA3 | | | | | | | | | | | 95 | |
| PA4 | | | | | | | | | | | | 95 |
| PK1 | 5 | 10 | 20 | 30 | 50 | 70 | 80 | 90 | 95 | 5 | 5 | 5 |
| Extrudability | Yes | Yes | Yes | Yes | Yes | Yes | Yes | Yes | Yes | No | No | No |
| MVI 240° C., 2.16 kg (cm$^3$/min) | 31 | 24 | 21 | 17 | 17 | 37 | 38 | 35 | 33 | | | |
| IS 23° C. (kJ/m$^2$) | n.b. | n.b. | n.b. | n.b. | n.b. | n.b. | n.b. | n.b. | n.b. | | | |
| NIS 23° C. (kJ/m$^2$) | 6 | 6 | 7 | 7 | 6 | 10 | 10 | 12 | 11 | | | |
| Yield stress (MPa) | 40 | 42 | 42 | 44 | 52 | 65 | 65 | 64 | 63 | | | |
| Elongation at break (%) | 210 | 240 | 290 | 280 | 280 | 210 | 300 | 300 | 300 | | | |
| HDT B (°C.) | 114 | 123 | 124 | 131 | | 186 | 187 | 187 | 184 | | | |
| Crystallization rate (J/g/min) | 54 | 49 | 61 | 67 | | 46 | 44 | 33 | 30 | | | | n.b. = no break
MVI = melt viscosity index
IS = impact strength (DIN 53453)
NIS = notch impact strength
HDT B = dimensional stability in heat destortion temperature B (0.45 MPa) (ISO 75)

Materials used:

aliphatic polyketone on the basis of ethylene, carbon monoxide and propylene, called polyketone 1 (PK1) in the following.

Melting point: 225° C.

Relative viscosity in 0.5% m-cresol: 1.68

Melt volume index (MVI) 240° C., 2.16 kg: 55 cm$^3$/10 min polyamides (PA1, PA2, PA3, PA4) on the basis of laurin lactam which are characterized in the following Table 1.

What is claimed is:

1. A polymer blend composition, the polymer blend composition comprising:

a linear alternating polyketone based on carbon monoxide and at least one ethylenically unsaturated hydrocarbon compound, the linear alternating polyketone displaying recurring units of the following formula:

$$-[CO(-CH_2-CH_2)]_x-[CO-(G-)]_y \qquad (I)$$
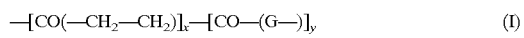

in which G is derived from an a-olefin monomer having at least three carbon atoms, at least two of the carbon atoms connected by an ethylenically unsaturated bond, x and y are whole numbers, and the ratio of y to x is not more than 0.5; and at least one polyamide having a numerical average molecular weight of above 5000, the polyamide having a carboxyl/amino end-groups ratio of more than 1, the mixture ratio of the polyamide to the polyketone polymer, relative to the polymer blend composition, being from 95 to 5 wt.-% to 5 to 95 wt.-% and the melting point of the polyamide not exceeding the melting point of the polyketone polymer.

2. The polymer blend composition of claim 1 wherein the polyamide displays amino end-groups of 15 $\mu\ddot{A}g/g$ or smaller.

3. The polymer blend composition of claim 1 wherein the melting point of the polyamide does not exceed 265° C.

4. The polymer blend composition of claim 1 wherein the melting point of the polyamide is between 150° C. and 250° C.

5. The polymer blend composition of claim 1 wherein the melting point of the polyamide is between 175° C. and 240° C.

6. The polymer blend composition of claim 1 wherein the G in formula I is propylene and the ratio of y to x lies between 0.01 and 0.1.

7. The polymer blend composition of claim 1 wherein:

the polyamide is aliphatic and partially crystalline, partially aromatic and amorphous, or partially aromatic and semicrystalline; and the polyamide is derived from monomers, each monomer selected from the group consisting of a lactam with 6 to 12 C atoms, an $\alpha,\omega$-aminocarboxylic acid with 6 or 12 C atoms, a dicarboxylic acid with 2 to 44 C atoms, an aliphatic or cycloaliphatic diamine with 2 to 12 C atoms, a dicarboxylic acid/diamine salt, and any of these in any combination.

8. The polymer blend composition of claim 7 wherein the polyamide is polyamide 12.

9. The polymer blend composition of claim 1, the polymer blend composition further comprising at least one block copolyester amide, the block copolyester amide having a carboxyl/amino end-groups ratio of more than 1, the mixture ratio of the combination of the polyamide and the block copolyester amide to the polyketone, relative to the polymer blend composition, being from 95 to 5 wt.-% to 5 to 95 wt.-%, the melting point of the block copolyester amide not exceeding the melting point of the polyketone polymer.

10. A process for the preparation of the polymer blend composition of claim 1, the process comprising;

placing the polyketone and the polyamide separately into the feed zone of an extruder; and extruding the polyketone and the polyamide in the extruder at a temperature between 240° C. and 270° C. to form the polymer blend composition.

11. A method of using the polymer blend composition of claim 1, the method comprising:

injection moulding or extruding components, the components comprising the polymer blend composition and the components selected from the group consisting of a filament, a fiber, a film, and a melt adhesion powder.

* * * * *